United States Patent [19]
Tanabe

[11] Patent Number: 4,561,031
[45] Date of Patent: Dec. 24, 1985

[54] AUTOMATIC CASSETTE LOADING APPARATUS
[75] Inventor: Minoru Tanabe, Daito, Japan
[73] Assignee: Matsushita Electric Industrial Company, Limited, Osaka, Japan
[21] Appl. No.: 407,272
[22] Filed: Aug. 10, 1982
[30] Foreign Application Priority Data
Aug. 11, 1981 [JP] Japan ............................... 56-125670
[51] Int. Cl.⁴ ...................... G11B 5/008; G11B 15/00
[52] U.S. Cl. ...................................... 360/96.5; 360/69
[58] Field of Search ............................. 360/96.5–96.6, 360/71, 93, 105, 137; 360/69
[56] References Cited
U.S. PATENT DOCUMENTS
4,308,562 12/1979 Negishi .
4,320,424  3/1982 Murayama ........................ 360/85 X
4,413,291 11/1983 Ueki ..................................... 360/93
4,423,445 12/1983 Okada ................................. 360/96.5

Primary Examiner—A. J. Heinz
Attorney, Agent, or Firm—Lowe, King, Price & Becker

[57] ABSTRACT

Disclosed is an automatic cassette loading apparatus which comprises a motor and a first sensing means for detecting when a cassette is placed in a first position to energize the motor. A counter is provided for counting clock pulses in response to the energization of the motor and generating an output signal when the counted clock pulses reach a predetermined value. A second sensing means is provided for detecting when the cassette is moved to a second, tape-operating position. The loading apparatus further includes a mechanism driven by the motor for moving the cassette from the first position to the second position and restoring the cassette to the first position and beyond to de-energize the motor when the output signal of the counter is generated prior to the detection of the cassette in the second position.

6 Claims, 11 Drawing Figures

4,561,031

AUTOMATIC CASSETTE LOADING APPARATUS

BACKGROUND OF THE INVENTION

The present invention relates generally to cassette tape recorders, and in particular to an automatic cassette loading apparatus in which the tape cassette is automatically loaded into an operating position by a motor and ejected instantly when inserted incorrectly to the apparatus to protect the motor from overcurrent. The invention is particularly suitable for applications such as automobiles where the available space is severely limited.

Automatic cassette loading is currently used in automobiles to minimize the manual handling of a tape cassette for safety purposes. Because of the limited space on the vehicle's instrument panel, conventional loading apparatus are designed so that cassette is inserted in a lengthwise direction through a slot. This slot is shaped to conform to the asymmetric transverse cross section of the cassette to prevent it from being inserted upside down. To allow smooth insertion of cassette, the slot is dimensioned slightly oversize the cassette. However, precision manufacture is required to ensure satisfactory slot size clearance, which results in a high manufacturing cost.

SUMMARY OF THE INVENTION

Accordingly, an object of the invention is to provide an automatic cassette loading apparatus comprising a slot sufficiently oversized to receive a cassette lengthwise so that it may be inserted on either side and driven by a motor toward an operating position, an arrangement being made to detect when the cassette is inserted incorrectly for ejecting it to prevent the motor from being heated by overcurrent.

The automatic cassette loading apparatus of the invention comprises a motor and a first sensing means for detecting when a cassette is placed in a first position to energize the motor. A counting means is provided for counting clock pulses in response to the energization of the motor and generating an output signal when the counted clock pulses reach a predetermined value. A second sensing means is provided for detecting when the cassette is moved to a second, tape-operating position. The loading apparatus further includes a mechanism which is driven by the motor for moving the cassette from the first position to the second position and restoring the cassette to the first position and beyond to de-energize the motor when the output signal of the counting means is generated prior to the detection of the cassette in the second position.

BRIEF DESCRIPTION OF THE DRAWINGS

The present invention will be described in further detail with reference to the accompanying drawings, in which.

DETAILED DESCRIPTION

Figure 1:
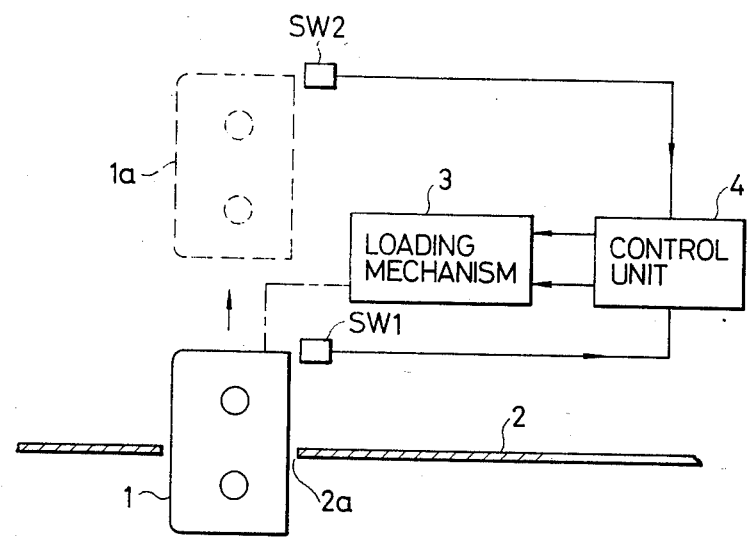
FIG. 1 is a schematic diagram illustrating a general structure of the automatic cassette loading apparatus of the invention.

Referring now to FIG. 1, the automatic cassette loading apparatus of the invention is schematically illustrated. The automatic loading apparatus comprises a loading mechanism generally shown at 3 which is mounted on the instrument panel 2 of an automobile, for example. The instrument panel 2 is formed with an opening 2a through which a tape cassette, preferably, microcassette 1 is manually inserted lengthwise as shown. The loading apparatus includes a first proximity switch SW1 located adjacent to the opening 2a to detect when the cassette 1 is inserted through the opening 2a. The switch SW1 signals a control unit 4 which in turn causes the loading mechanism 3 to move the cassette 1 horizontally and then downwardly to a playing position indicated by a broken line 1a in a manner as detailed hereinbelow. A second proximity switch SW2 is provided to detect when the cassette 1 is moved to the correct playing position to signal the control unit 4 to generate an output signal which is used to trigger the cassette tape recorder into operation while de-energizing the loading mechanism 3.

Figure 4:
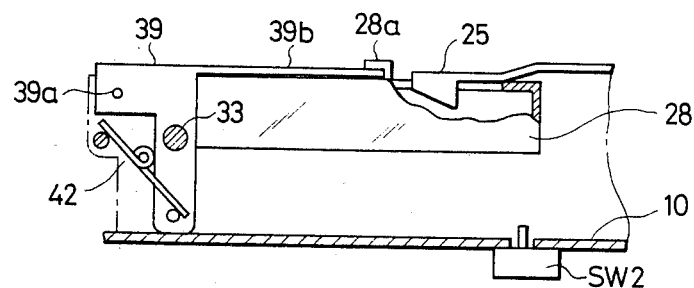
FIG. 4 is a cross-sectional view taken along the lines 4—4 of FIG. 2.
Figure 6:
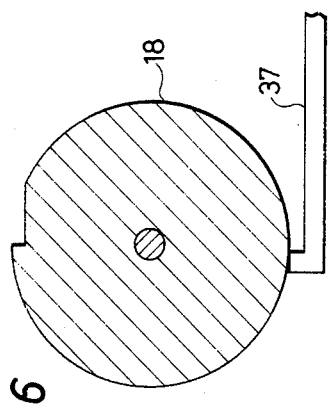
FIG. 6 is a cross-sectional view taken along the lines 6—6 of FIG. 2.
Figure 7:
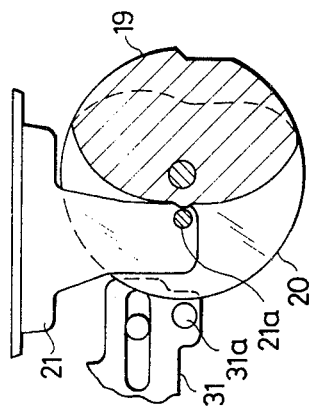
FIG. 7 is a cross-sectional view taken along the lines 7—7 of FIG. 2.
Figure 5:
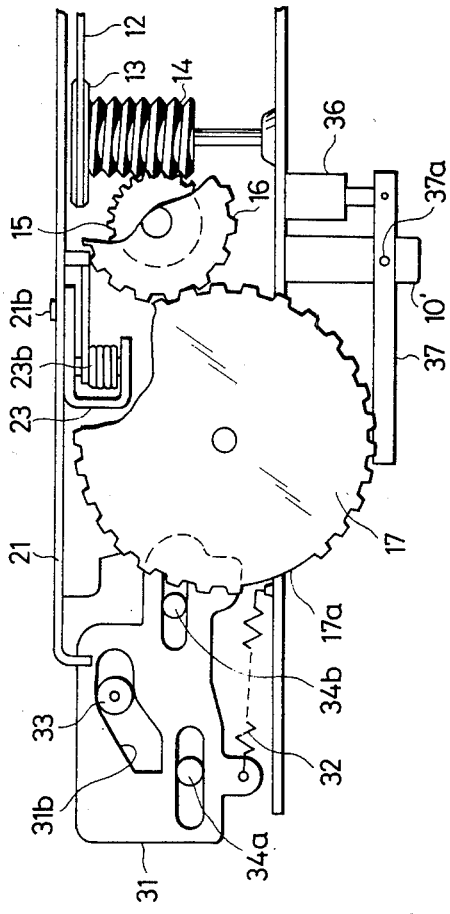
FIG. 5 is a side view of the loading mechanism of FIG. 2.

Details of the loading mechanism 3 are illustrated in FIGS. 2 to 7. The loading mechanism 3 comprises a d.c. motor 11 mounted on a main chassis 10. The motor 11 has its rotor shaft coupled by a belt 12 to a pulley 13 which is in turn coupled for rotation therewith a worm gear 14 (shown in FIG. 5). The worm gear 14 is in mesh with a worm wheel 15 which is integrally formed with a toothed wheel 16. A spring-biased rotary assembly of gear and cams is provided comprising a toothed wheel 17, a lock cam 18, a horizontal cam 19 and a vertical cam 20. The toothed wheel 17 includes a toothless portion 17a (FIG. 5) on the circumference thereof. When the cassette 1 is not loaded into the apparatus, the gear-and-cam assembly is in the position as indicated in FIGS. 5 to 7, so that the toothed wheel 17 is in mesh with the toothed wheel 16. Each of the horizontal and vertical cams 19 and 20 is formed with a pair of first and second identical camming faces symmetrical to the center of rotation of the assembly and the first and second camming faces of each cam are facing opposite to those of the other as clearly seen in FIG. 7.

Figure 3:
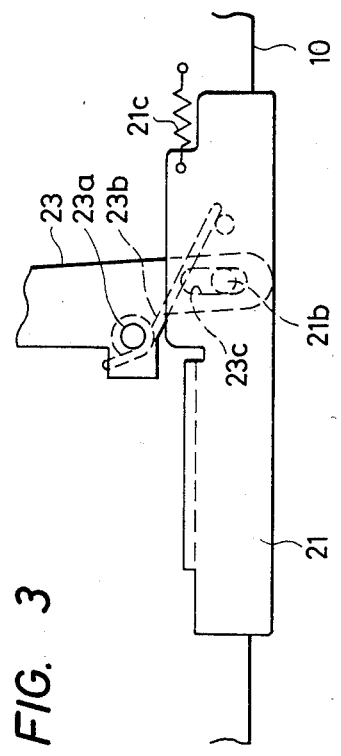
FIG. 3 is a partial plan view of the loading mechanism of FIG. 2.

Below the chassis 10 is mounted a restoring solenoid 36 with its plunger operatively coupled to a lock arm 37 which is supported on a pivot 37a. In the position of FIG. 6, the lock arm 37 is in free contact with the lock cam 18 to allow the gear-and-cam assembly to be driven by the wheel 16. The horizontal cam 19 is engaged with a cam follower or pin 21a mounted on the vertical portion of an angled slide member 21 which is also formed with a second or drive pin 21b on its horizontal portion and is normally biased to the right by a spring 21c as seen in FIG. 3 to maintain pressure contact between pin 21a and cam 19. When the gear-and-cam assembly rotates about its axis in response to the energization of the motor 11, the slide member 21 is moved to the left against the spring 21c from the position of FIG. 3. The vertical cam 20 is in engagement with a cam follower or pin 31a mounted on a slide member 31 which is movable on guide pins 34a and 34b mounted on a wall 50 and is biased to the right by means of a spring 32. The slide member 31 is formed with an opening 31b having a slope on which a roller 33 is adapted to ride so that it moves downward when the slide member 31 is moved to the right. As shown in FIG. 4, the roller 33 is fixed to a lever 39 which, pivoted at 39a, has an extension arm 39b engaged with a recess 28a of a cassette holder 28.

Figure 2:
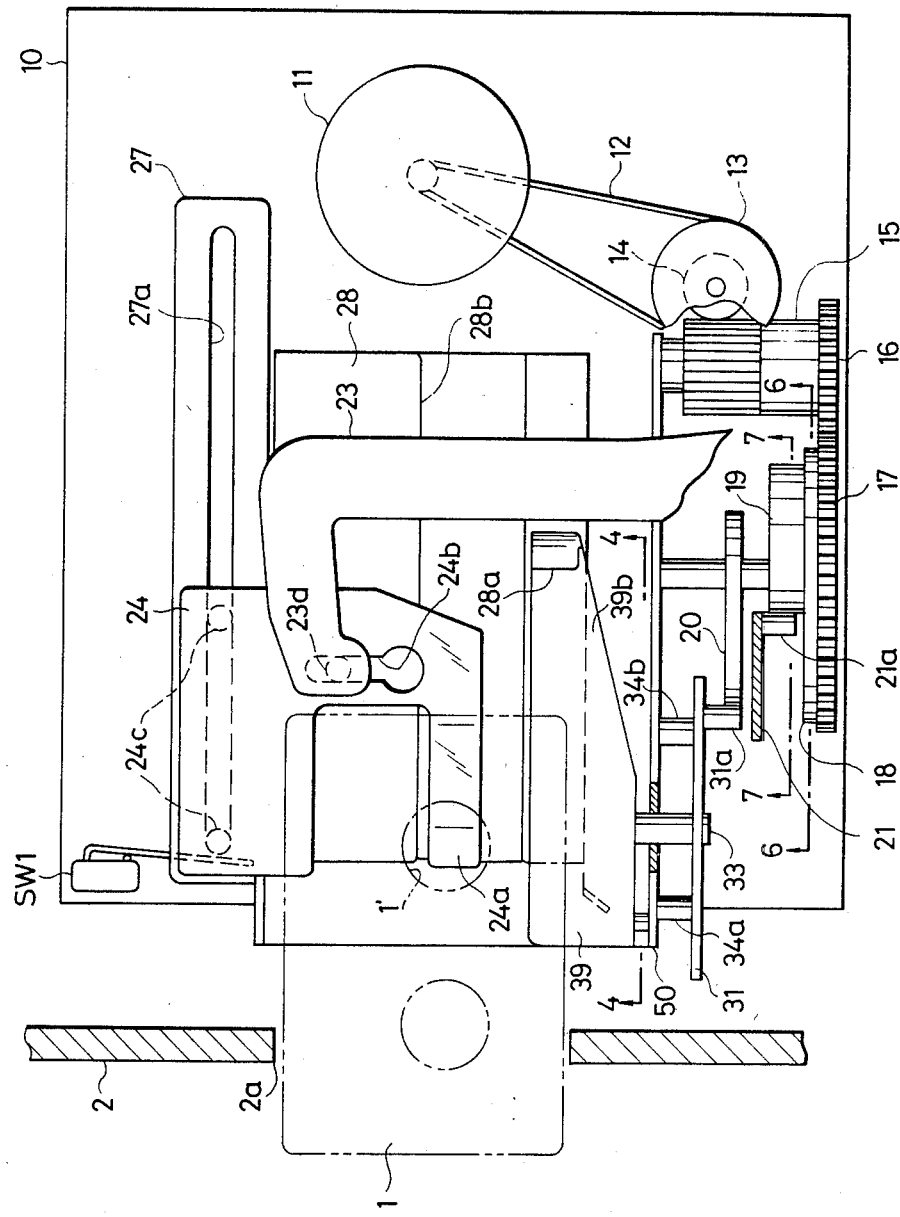
FIG. 2 is a plan view of the loading mechanism of FIG. 1 when a microcassette is in a front position.

As shown in FIG. 2 the cassette holder 28 is of a rectangular construction to accept a cassette therein and formed with a channel 28b extending along its upper face from front to rear ends to allow a latch 24a to engage with a hub opening 1' of the cassette 1. The latch 24a forms part of a slide member 24 having an opening 24b and guide pins 24c by which the slide member 24 movably engages in a guide groove 27a of a guide member 27 stationarily mounted above the chassis 10.

A horizontal lever 23 is pivoted on a pin 23a which is mounted on an upper chassis 10'. The lever 23 is biased clockwise by means of a spring and includes an opening 23c in which the drive pin 21b of the slide member 21 is engaged (FIG. 3). The lever 23 further includes a pin 23d extending downwardly from its free end to engage with the opening 24b of the slide member 24. When the slide member 21 is moved to the left, the lever 23 is turned clockwise by the drive pin 21b, so that the slide member 24 is caused to move from the front position (FIG. 2) to a rearward position.

Figure 11:
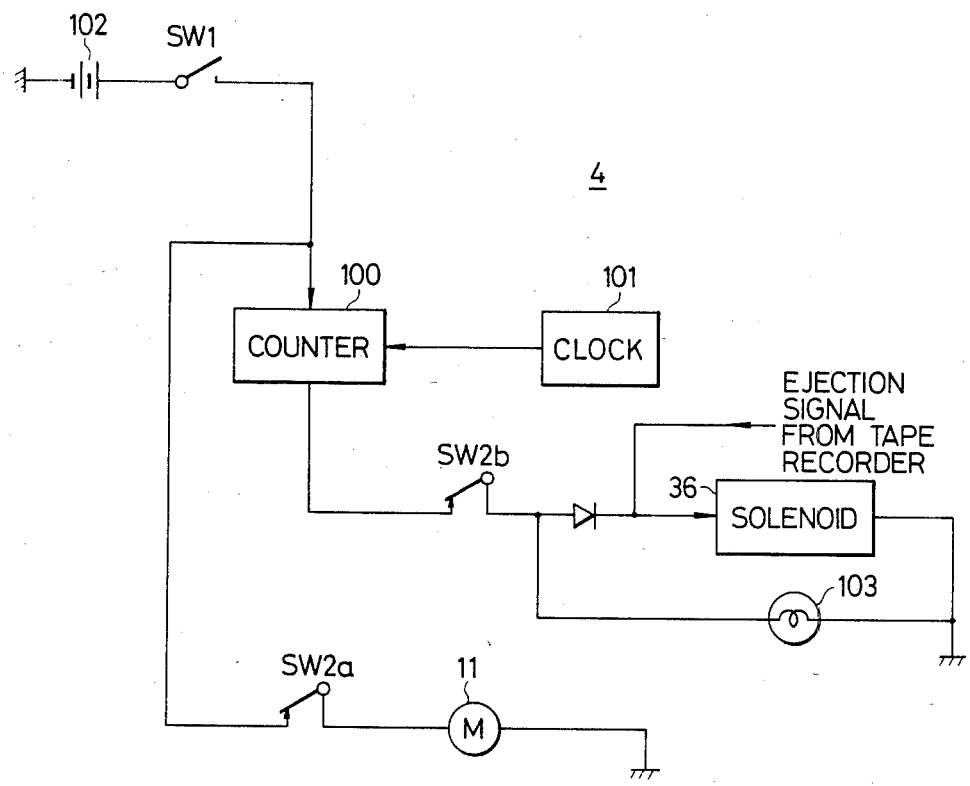
FIG. 11 is a circuit diagram of the control unit of FIG. 1.

The first proximity switch SW1 is mounted on the chassis 10 in a position adjacent to the slide member 24 so that its moving contact arm is in engagement with the pin 24c to maintain an open circuit condition. As shown in FIG. 11, the control unit 4 comprises a counter 100 and a clock source 101. The switch SW1 is connected in a circuit from a d.c. voltage source 102 to the reset input of the counter 100. The second proximity switch SW2, which includes two sets of normally closed contact pairs SW2a and SW2b, is mounted below the chassis 10 as shown in FIG. 4 so that its moving contact arm extends through the chassis 10 to engage with the bottom wall of the cassette holder 28 when the latter is in downward, or playing position. The counter 100 receives clock pulses from the clock source 101 to start counting the clock in response to a high level voltage coupled from the switch SW1 to generate a counter output when a predetermined count is reached. The counter output is applied through the contacts SW2b to the restoring solenoid 36.

Figure 8:
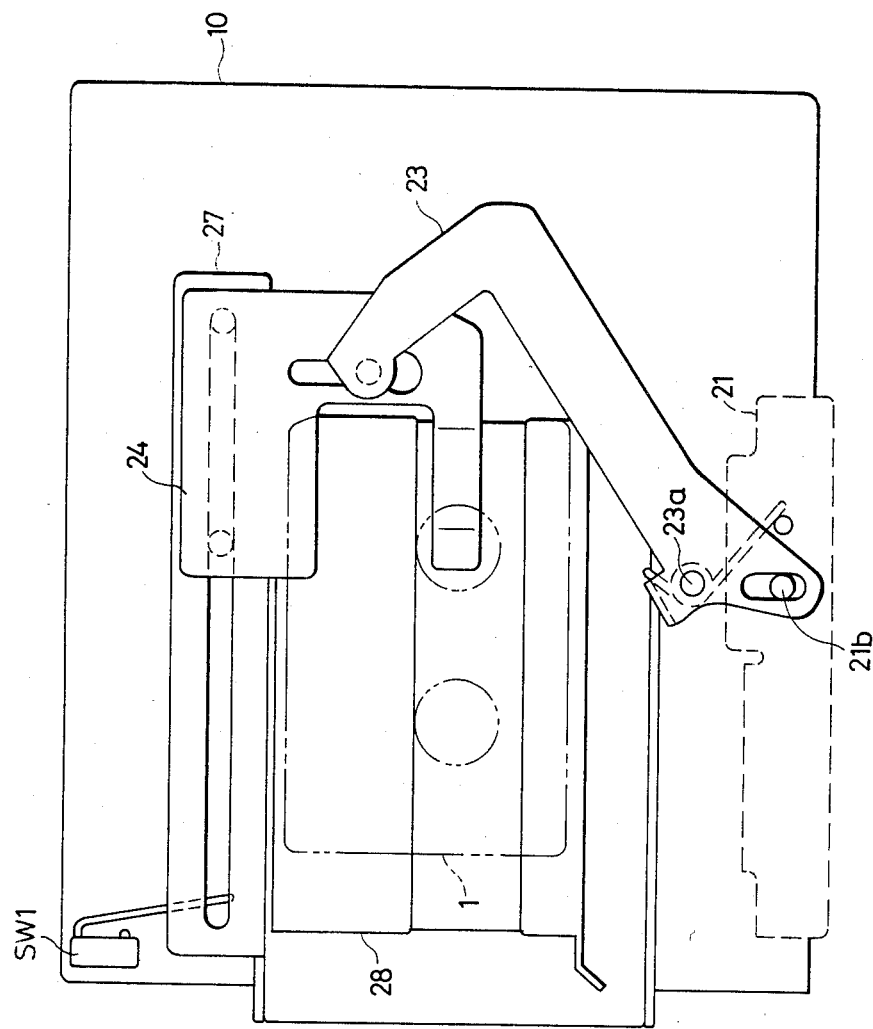
FIG. 8 is a plan view of the loading mechanism when the cassette is moved to a rear position.
Figure 9:
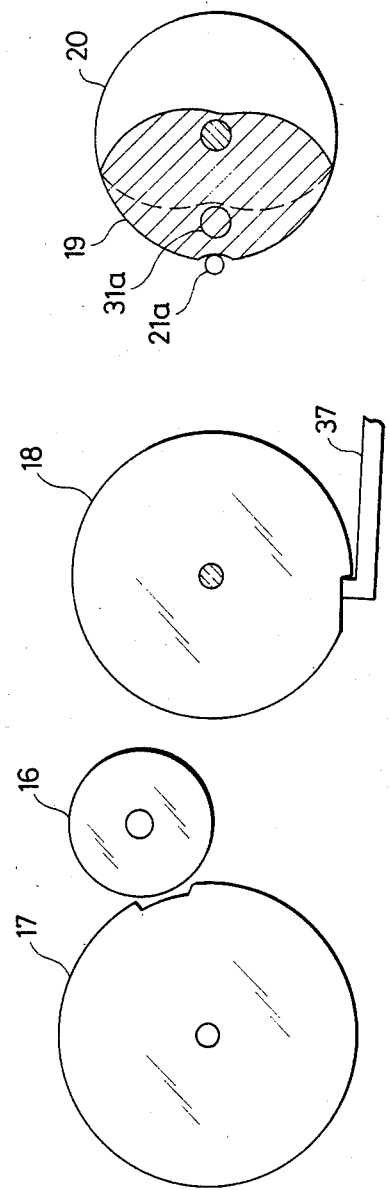
FIG. 9 is a view illustrating the angular positions of the gear-and-cam assembly when the loading mechanism is in the position of FIG. 8.
Figure 10:
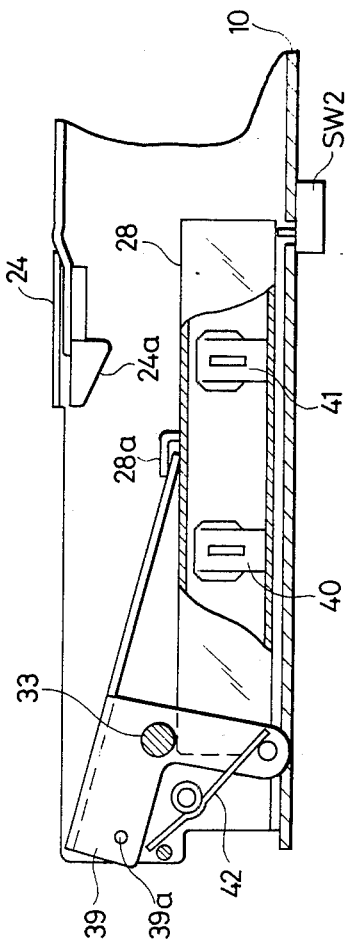
FIG. 10 corresponds to FIG. 4 when the cassette is moved to the downward position.

The operation of the automatic cassette loading apparatus will now be described. If the cassette 1 is assumed to be correctly inserted through the slot 2a, the latch 24a engages the hub opening 1' as shown in FIG. 2 while the first switch SW1 is closed to complete a circuit for the counter 100 and for the d.c. motor 11. The gear-and-cam assembly is rotated by the motor 11 and the lever 23 turns clockwise by camming engagement between horizontal cam 19 and pin 21a. The latch 24a is moved through the passage 28b pulling the cassette 1 horizontally to the rearward position through a passage inside of cassette holder 28 as illustrated in FIG. 8. Subsequently, the pin 31a comes into contact with the first camming face of the vertical cam 20 to move the slide member 31 to the right causing the lever 39 to turn clockwise. Since the cassette 1 is assumed to have been correctly inserted to the apparatus, the hub openings of the cassette are aligned with the spindles 40 and 41 of the tape recorder, so that the cassette holder 28 moves to the downward position (FIG. 10) to place the cassette 1 in the tape-playing position. After the gear-and-cam assembly turns 180 degrees, the lock cam 18 comes into engagement with the lock arm 37, so that the toothed wheel 17 disengages from meshing contact with the driving wheel 16 as shown in FIG. 9, and the gear-and-cam assembly is locked in position.

The sequence of events just described above occurs within the period of the counter 100 and the switch contacts SW2a and SW2b are opened to de-energize the motor 11 to cut off the circuit for the solenoid 36 before the latter is energized by the counter output. The tape recorder is now conditioned to play the cassette 1 in a conventional manner.

When ejecting the cassette 1 the solenoid 36 is energized by an ejection signal. When this occurs, the lock arm 37 is disengaged from contact with the cam 18. Due to the spring-biased action of the gear-and-cam assembly, the toothed portion of the wheel 17 engages the drive wheel 16 again. The cam follower 31a of the vertical slide member 31 now engages with the second camming face of the vertical cam 20 to move the cassette holder 28 to the upward position. This action is followed by the cam follower 21a of the horizontal slide member 21 which engages the second camming face of the horizontal cam 19 to move the cassette 1 to the front position and beyond, causing the first switch SW1 to open to de-energize the motor 11.

If the cassette 1 is not correctly inserted to the apparatus, the spindles 40 and 41 are not aligned with the hub openings of the cassette since these openings are provided in positions offset from the center line of the cassette. When this occurs, the cassette holder 28 is held in a position above the second switch SW2 and the counter 100 will therefore generate an output to energize the solenoid 36. The lock arm 37 is thus disengaged from contact with the lock cam 18 to cause the toothed wheel 17 to mesh with the drive wheel 16 again to allow the gear-and-cam assembly to return to the starting position in the same manner as when the cassette is ejected in response to the ejection signal and the motor 11 is thus de-energized to prevent it from being energized with a large current for a long period of time.

The loading apparatus of the invention is also efffective to eject the cassette and de-energize the motor when the cassette encounters an an obstacle during its travel to the playing position even though it is correctly inserted to the apparatus.

The control unit 5 preferably includes a warning lamp 103 to give a warning signal in the event of such failures.

What is claimed is:

1. An automatic cassette loading apparatus comprising:
   a motor;
   first sensing means for detecting when a cassette is placed in a first position to energize said motor;
   counting means for generating an output signal when a count representing time elapsed from the energization of said motor exceeds a predetermined value;

second sensing means for detecting when said cassette is moved to a second, tape-operating position;

means driven by said motor responsive to said first sensing means for moving said cassette from said first position to said second position, and for moving said cassette back at least to said first position and for de-energizing said notor thereafter when said output signal is generated prior to the detection of said cassette in said second position, a cassette holder defining a passageway for a cassette to move between a front position and a rear position and movable between an upward position and a downward position corresponding to said second position, wherein said first position corresponds to said cassette being located in said front upward position and said second position corresponds to said cassette being located in said rear downward position; and wherein said moving means comprises:

means driven by said motor for moving said cassette along said passageway from said front position to said rear position and for subsequently moving said cassette holder from said upward position to said downward position to place said cassette in said rear downward position and for moving said cassette back to said front upward position when said output signal is generated prior to the detection of said cassette in said rear downward position, a toothed wheel driven by said motor;

a lock arm;

a spring-biased rotary assembly comprising a wheel having a toothed peripheral portion engageable with said toothed wheel and a toothless peripheral portion for disengaging the wheel from contact with said toothed wheel, a first cam engageable with said lock arm when said wheels are disengaged from contact with each other, and second and third cams, each of the second and third cams being formed with a pair of first and second camming faces symmetrical to a center of rotation of the assembly;

means including a first cam follower engageable with said second cam for moving said cassette from said front position to said rear position when engaging with the first camming face thereof and moving said cassette from said rear position to said front position when engaging with the second camming face thereof;

means including a second cam follower engageable with said third cam for moving said cassette holder from said upward position to said downward position when engaging with the first camming face thereof and moving said cassette holder from said downward position to said upward position when engaging with the second camming face thereof; and a solenoid energizable in response to the output signal of said counter means for disengaging said lock arm from contact with said first cam to cause said toothed portion to engage with said toothed wheel.

2. An automatic cassette loading apparatus as claimed in claim 1, wherein the passageway of said cassette holder is shaped to accommodate the cassette in a lengthwise direction.

3. In a cassette loading and unloading apparatus having a first switch means for detecting placement of a cassette in a first position, a motor means for moving said cassette from the first position to a second position, a second switch means for detecting wheh the cassette is placed in a second, tape-playing position, means for generating a signal when the placement of the cassette in said second position is not detected within a predetermined period elapsed from the placement of said cassette in said first position, and a solenoid means for moving the cassette from the second position at least to the first position in response to said signal, the improvement comprising a rotary assembly including:

a toothed wheel driven by said motor means;

a lock arm;

a spring-biased rotary assembly having a shaft;

a wheel coaxially mounted on said shaft and having a toothed peripheral portion engageable with said toothed wheel and a toothless portion for disengaging from said toothed wheel;

a first cam having first and second arc portions of approximately 180° for camming contact with said lock arm when said wheel is engaged with said toothed wheel and a notch located between said arc portions with which said lock arm engages for locking said wheel;

second and third cams each having a pair of substantially identical first and second camming faces corresponding to said first and second arc portions and symmetrical to a center of rotation of the assembly;

a first cam follower means for moving said cassette from the first position to an intermediate position in camming contact with the first camming face of the second cam during a first quarter turn of said wheel and moving said cassette from the intermediate position to said first position in camming contact with the second camming face of the second cam during a fourth quarter turn of said wheel; and a second cam follower for moving the cassette from said intermediate position to said second position in camming contact with the first camming face of the third cam during a second quarter turn of said wheel and moving the cassette from said second position to said intermediate position in camming contact with the second camming face of the third cam during a third quarter turn of said wheel, said solenoid means being responsive to said signal for disengaging said lock arm from the notch of the first cam to cause said wheel to reengage with said toothed wheel by spring action and allowing said cassette to be returned to said first position sequentially by the action of said second and first cam followers.

4. A cassette loading and unloading apparatus as claimed in claim 3, further comprising means for energizing said solenoid means for an interval sufficient to release said lock arm from the notch of said wheel.

5. A cassette loading and unloading apparatus as claimed in claim 3, wherein said wheel is arranged for rotation in one direction and said motor means comprises a unidirectionally operatable motor.

6. A cassette loading and unloading apparatus as claimed in claim 3, wherein said rotary assembly is arranged to rotate and to provide substantially constant thrust for ejection of the ceassette in response to said signal.

* * * * *